(No Model.) 2 Sheets—Sheet 1.

S. HANSON & J. S. LEAS.
GRAIN SCOURER.

No. 276,966. Patented May 1, 1883.

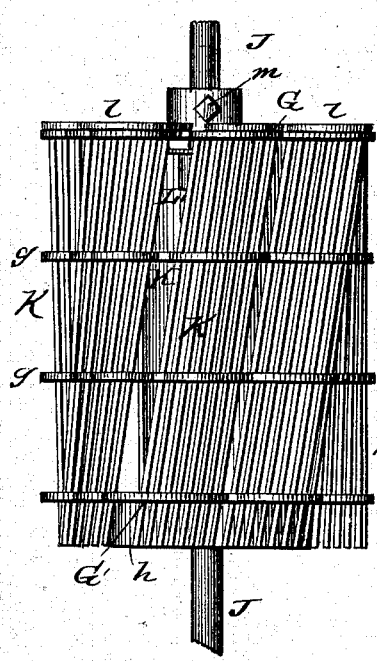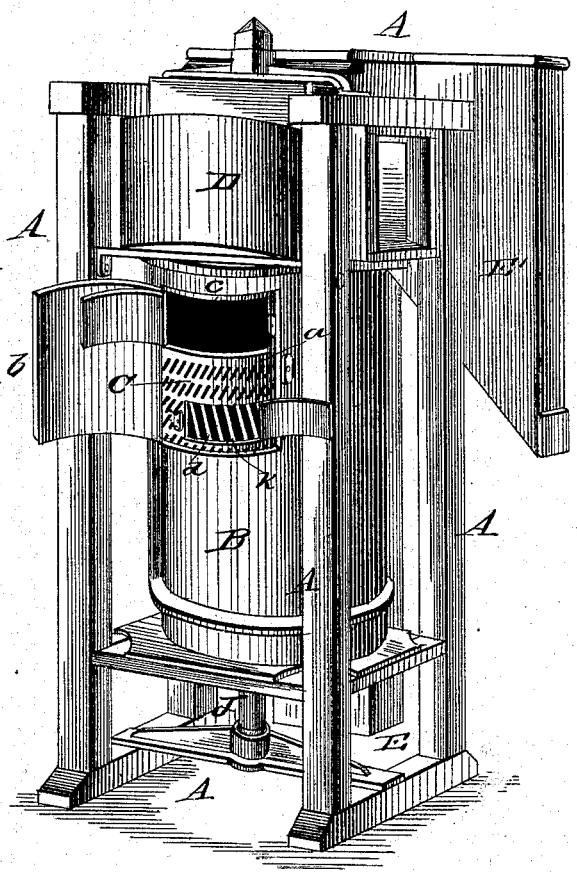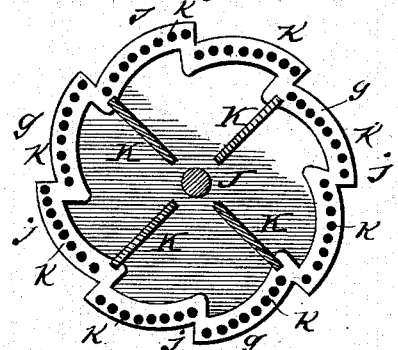

UNITED STATES PATENT OFFICE.

SWAN HANSON, OF MOLINE, AND J. SILAS LEAS, OF ROCK ISLAND, ASSIGNORS TO THE BARNARD & LEAS MANUFACTURING COMPANY, OF MOLINE, ILLINOIS.

GRAIN-SCOURER.

SPECIFICATION forming part of Letters Patent No. 276,966, dated May 1, 1883.

Application filed December 7, 1882. (No model.)

*To all whom it may concern:*

Be it known that we, SWAN HANSON, of Moline, and J. SILAS LEAS, of Rock Island, in the county of Rock Island and State of Illinois, have invented certain new and useful Improvements in Grain-Scourers; and we do hereby declare that the following is a full, clear, and exact description thereof, reference being had to the accompanying drawings, and to the letters of reference marked thereon, which form part of this specification, in which—

Figure 1:
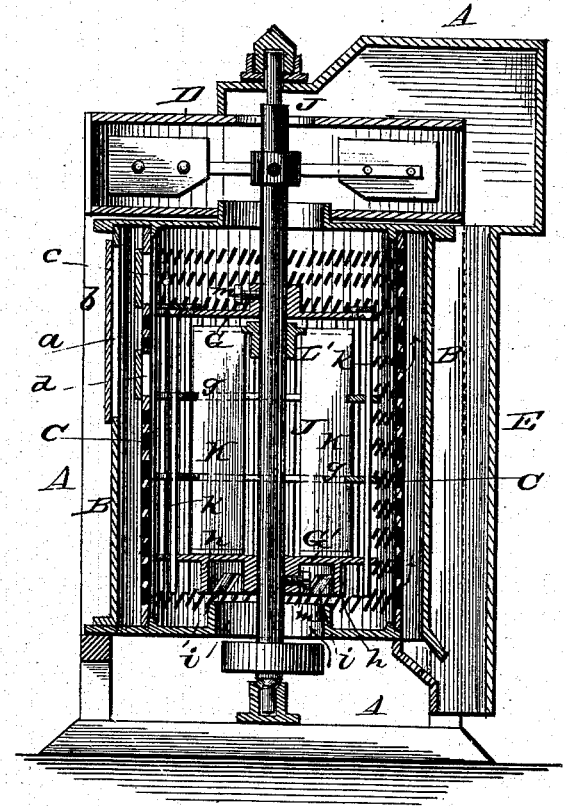
Figure 2:
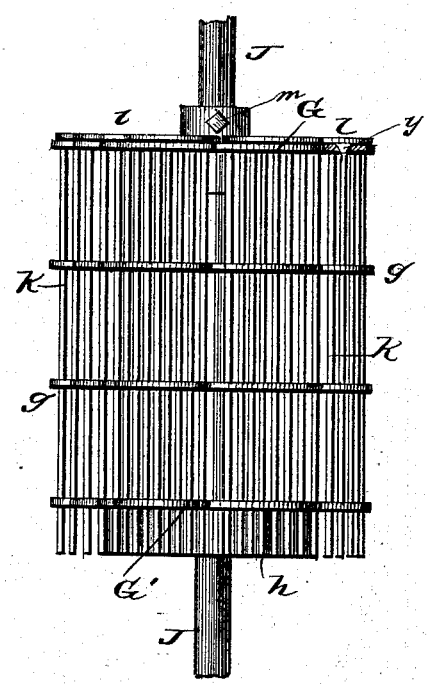
Figure 5:
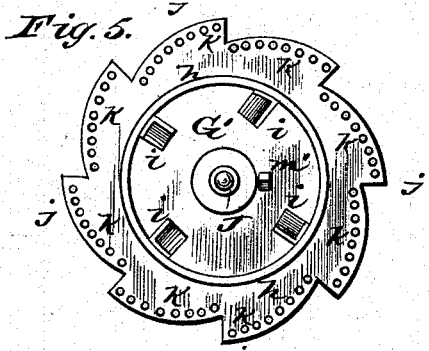
Figure 4:
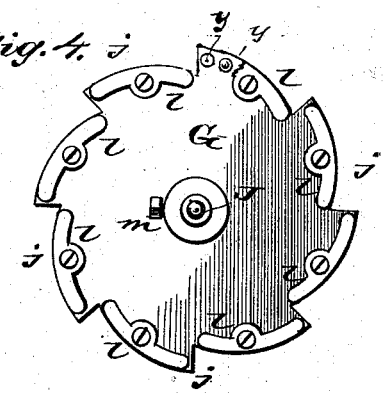

Figure 1 is a vertical central section of our improved smut-mill or grain-scourer, showing the revolving beater arranged in its two casings, and also the doors therein. Fig. 2 is a side elevation of the beater detached from its case, showing the beater-rods adjusted in lines parallel to the axis of the beater-shaft. Fig. 3 is a detail of the beater, showing the rods adjusted obliquely to the beater-shaft. Fig. 4 is a top view of the beater. Fig. 5 is a bottom view of the beater. Fig. 6 is a horizontal section of the beater, and Fig. 7 is a perspective view of the machine complete.

This invention relates to machines for cleaning grain of smut-balls, wherein a rapidly-revolving vertical drum or beater is applied inside of a scouring case or cylinder, which is arranged inside of another case, a space being left between the two cases for the escape of the foreign matters; and the nature of our invention consists in a certain novel construction of the revolving beater, whereby the beater-rods can be conveniently adjusted from vertical positions and set at any desired angle, for the purpose of scouring wheat or any of the more tender cereals—such as barley, buckwheat, &c.—as will be fully understood from the following description when taken in connection with the annexed drawings.

A designates the frame of the machine, in which is mounted the outer cylindrical case, B, an internal scouring-cylinder, C, the beater, and the top case, D, together with the trunks E E'. The outer case, B, is provided near its upper end with a large opening, $a$, and a door, $b$, for closing it. Directly opposite the said opening two openings, $c\,d$, are made through the scouring-cylinder C, which are both provided with doors. If desired, there may be a single large opening through the cylinder C, instead of the two openings shown. The objects of these openings will be hereinafter explained.

Inside of the scouring-cylinder, and supported vertically by suitable bearings, is our improved beater, to which rapid rotation is given by means of a belt and pulley. This beater consists of a top plate or head, G, a bottom plate, G', intermediate bracing-rings, $g$, a central vertical shaft, J, internal fan-blades, K, an annular bottom flange, $h$, and inclined outwardly-discharging wings $i$, applied inside of this flange for deflecting the material outwardly from beneath the bottom plate, G'. The circumference of the head, the bottom plate, and the intermediate rings are formed, as shown in Figs. 4, 5, and 6, of short curves $j$, which are tangent to a circle concentric to the axis of the vertical shaft J and described within the circumference of the beater. The said tangential curves $j$ are all of equal length, and they are perforated for receiving freely the beater-rods $k$. These rods are passed through the said plates and rings from above downward, and are headed on their upper ends at $y$, and held down in their places by removable segmental plates $l$, applied over their heads, and secured to the top plate, G, by screws. This allows broken or worn rods to be replaced by new rods. The top and bottom plates, G G', are secured to the vertical shaft J by means of set-screws $m\,m'$, passed through hubs formed on said plates.

Inside of the beater we employ a fan, K, which is composed of a number of radial blades, secured rigidly at their lower ends to the bottom plate, G', and also secured rigidly at their upper ends to a spider, L', the hub of which is made fast to the shaft J by a set-screw or other means. The fan K is thus secured to the shaft J independently of the top plate or head, G.

It has been above stated that the beater-rods $k$ are loosely applied to their plates and rings. The object of this is, that when the set-screw $m$ of the top plate or head, G, of the beater is loosened this head may be moved about the axis of the shaft J, either to the right or left hand, for the purpose of adjusting all of the beater-rods (at the same time)

in lines parallel to the shaft J, or setting these rods obliquely or at any desired angle to said shaft. The set-screw m above referred to is accessible through the aperture c in the scouring-cylinder when the door b and the door which closes said aperture are opened. The opening d is designed for exposing to view the beater-rods, so that an attendant can readily ascertain the position of these beater-rods. By means of the openings through the external case and the scouring-cylinder access can be had to the interior of the latter without removing any part of the machine. When the beater-rods are in vertical positions parallel to the central shaft, J, and the beater is revolved, say, five hundred or six hundred times per minute, the beater will scour wheat very nicely. When the rods k are inclined backward from the line of motion so that their lower ends are in advance of their upper ends, they will then hold the grain in the machine longer, and thus scour much harder. The reverse of this is true when the top plate is moved forward and the beater-rods are thus set so that they incline forward. In this case the grain is moved down rapidly through the machine, and is consequently scoured less. We thus adapt the machine for scouring very tender grain—such as barley, buckwheat, and other tender cereals.

The object of securing the fan to the shaft J independently of the top adjustable plate, G, is, that the blades of the fan will not be twisted, and the said plate and the beater-rods can be adjusted with ease.

The material is fed into the cylinder C, near its upper end, through a hopper, (not shown,) and subjected to the beating action of the rods k and the blast of the fan-blades K. The dust and other fine foreign matters are thereby forcibly driven through the perforations in the cylinder C into the annular space between this cylinder and the shell or case B. These light particles are then drawn into and expelled from the fan-case D by the revolution of the fan therein. The good material, together with heavy foreign particles which are not driven through the cylinder C, is discharged into a spout, E, near its lower end, up through which is a strong blast of air induced by the fan in the case D. Another separation thus takes place near the lower end of the trunk E, the heavier material being discharged from this end, while the lighter matters are drawn up into the inclined bottom trunk, E', which has a valve at its lower end. These parts are all old and well known in scourers, and are not herein claimed. They are represented in the drawings for the purpose of showing one practical application of our improvements.

Having thus fully described our invention, what we claim as new, and desire to secure by Letters Patent, is—

1. In a grain-scourer, the combination of a beater having an adjustable head, G, on shaft J, and provided with beater-rods, the scouring-cylinder, the inclosing-case, and doors in the said cylinder and case, all constructed and adapted to operate substantially in the manner and for the purposes described.

2. The combination, in a grain-scourer, of the beater-shaft J, the fixed and adjustable plates G G', the beater-rods applied loosely thereto, and a fan, the blades of which are secured at their lower ends to the plate G', and at their upper ends to a spider fixed directly to the shaft, all constructed and arranged to operate substantially as and for the purposes set forth.

In testimony that we claim the foregoing as our own we affix our signatures in presence of two witnesses.

SWAN HANSON.
J. SILAS LEAS.

Witnesses:
J. S. GILLMORE,
W. E. TOLLES.